United States Patent [19]
von Haas et al.

[11] Patent Number: 5,354,156
[45] Date of Patent: Oct. 11, 1994

[54] DRILLING TOOL

[75] Inventors: Rainer von Haas, Geesthacht; Manfred Wegener, Essen, both of Fed. Rep. of Germany

[73] Assignee: Krupp Widia GmbH, Essen, Fed. Rep. of Germany

[21] Appl. No.: 955,860

[22] PCT Filed: May 22, 1991

[86] PCT No.: PCT/DE91/00425
§ 371 Date: Dec. 4, 1992
§ 102(e) Date: Dec. 4, 1992

[87] PCT Pub. No.: WO91/18700
PCT Pub. Date: Dec. 12, 1991

[30] Foreign Application Priority Data
Jun. 6, 1990 [DE] Fed. Rep. of Germany ....... 4018043

[51] Int. Cl.$^5$ .................................................. B23B 51/00
[52] U.S. Cl. ........................................ 408/223; 408/713
[58] Field of Search ............... 408/187, 188, 189, 194, 408/200, 223, 224, 227, 230, 713

[56] References Cited
U.S. PATENT DOCUMENTS

| | | | |
|---|---|---|---|
| 4,230,429 | 10/1980 | Eckle | 408/223 |
| 4,889,455 | 12/1989 | Karlsson et al. | 408/224 |
| 4,889,456 | 12/1989 | Killinger | 408/224 |
| 5,049,011 | 9/1991 | Bohnet et al. | 408/223 |

FOREIGN PATENT DOCUMENTS

| | | |
|---|---|---|
| 0054913A2 | 6/1982 | European Pat. Off. . |
| 0088505A1 | 9/1983 | European Pat. Off. . |
| 0181844 | 5/1986 | European Pat. Off. . |
| 2730418B1 | 1/1979 | Fed. Rep. of Germany . |
| 2751255C2 | 10/1984 | Fed. Rep. of Germany . |
| 3802290C1 | 6/1989 | Fed. Rep. of Germany . |
| 2143174 | 2/1973 | France . |
| 2016316A | 9/1979 | United Kingdom . |
| 2184373A | 6/1987 | United Kingdom . |

*Primary Examiner*—Daniel W. Howell
*Attorney, Agent, or Firm*—Herbert Dubno; Yuri Kateshov

[57] ABSTRACT

A drilling tool for drilling bores in solid metal, with a shank having at its front end several geometrically similar indexable inserts arranged at various radial distances and staggered with respect to each other by the same peripheral angle, whose working areas overlap, each of them having two equally long cutting edges, two of the respectively contiguous cutting edges inclined with respect to each other at an obtuse angle being simultaneously engaged, whereby the radial inner indexable insert extends slightly with one of its engaged cutting edges beyond the drill axis, at least one of the bisectors of the two pair set cutting edges of indexable inserts being inclined with respect to the longitudinal shank axis by an angle up to 25° m and at least one of the bisectors running at an angle differing from zero with respect to another bisector, so that the sum total differing from zero of the radial force component ($F_R$) resulting from all engaged effective cutting edges and the corresponding sum of the horizontal force components ($F_H$) form a general resultant ($F_{RES}$) acting upon the cutting edges and which is oriented in the direction of the radially utmost indexable insert at an angle ($\beta$) differing therefrom by maximum 45°.

16 Claims, 6 Drawing Sheets

DRILLING TOOL

CROSS REFERENCES TO RELATED APPLICATIONS

This application is a national phase of PCT/DE 91/00425 filed May 22, 1991 and based upon a German application P 4018043.3 filed Jun. 6, 1990 under the International Convention.

FIELD OF THE INVENTION

The invention relates to a drilling tool for drilling bores in solid metal, with a shank having at its front end several indexable inserts arranged at various radial distances and staggered with respect to each other by the same peripheral angle, their working areas overlapping, whereby the radially inner indexable insert slightly extends beyond the drill axis with its engaged cutting edge.

BACKGROUND OF THE INVENTION

It is known to the state of the art that depending on the arrangement of the indexable inserts the asymmetrical cutting force conditions lead to an unfavorable radial action of the force on the drill shank, which can cause the drilling to deviate. For this reason, many times the operation is performed with one or more support rods fastened to the drill shank, which support the drilling tool against the bore walling. The drawback is that the support rods are highly subjected to wear and besides can not prevent the machine support of the drill from being exposed to a heavy load. Also surface quality of the bore is very defective.

Therefore the DE 27 30 418 C2 proposes a drilling tool wherein the bisector of the engaged cutting edge of each indexable insert is arranged parallelly to the drill axis. As cutting inserts, preferably, indexable inserts, are used, wherein at each second cutting edge the neighboring cutting edges define an angle of 156°. However, a force balancing of the drill shank in radial direction, which is supposed to be accomplished by this drilling tool, is only then possible when each time both engaged cutting edges are basically engaged over their full length. In other words, the working areas are not allowed to overlap. Such structure has the disadvantage that when the diameter of the bore is changed, a new set of cutting inserts has to be used.

In order to eliminate this disadvantage, the EP 0 054 913 B1 proposes that the mounting for the individual indexable inserts be arranged so that the radial cutting force components of the engaged cutting edge are balanced for each individual indexable insert, in that the bisectors of these cutting edges are inclined with respect to the parallel to the drill axis by an angle which depends on the effective length of the cutting edge engaged along a partial segment.

In order to balance the radial forces, in DE 27 51 255 C2 it has also been proposed to bend the radial plane of the inner cutting insert towards the rear, against the rotating direction of the drill, by a certain angle with respect to the peripherally arranged cutting insert. However, as a result the forces are merely parallelly oriented, but not balanced, since the angle of displacement can not have any influence on the size of the radial or cutting forces. This way the forces are maintained as a function of the cutting conditions and are independent from the geometry of the tool.

Finally in the DE 38 02 290 C1 dealing particularly with drilling through stacks of plates but also through a single piece solid metal material, it has been proposed to arrange a first indexable insert radially outside on a diameter beyond the half defined by the drill axis and on the opposite side to arrange two smaller indexable inserts, whereby the effective outer cutting edge of the indexable insert arranged radially outside runs approximately on the same working cone and the same maximal radius as the radially outer cutting edge of the largest indexable insert. This arrangement is also supposed to achieve merely a balance of the radial cutting forces.

OBJECT OF THE INVENTION

It is the object of the present invention to further develope the aforementioned drilling tool, so that all influences beyond the radial force components be taken into account during drilling, with the purpose to cover the largest possible area of staggered bore diameters with a minimum of indexable insert sets, whereby scores are avoided in the bore hole.

SUMMARY OF THE INVENTION

This problem is solved by a drilling tool according to the present invention. Compared to the aforementioned drilling tools according to the state of the art, the difference resides in the conscious selection of an indexable insert arrangement wherein the sum of the radial force components resulting from the total of effective cutting edges in engagement does not equal zero. According to the invention, the remaining radial force components form together with the sum of all horizontal force components an overall resultant acting on the cutting edge, oriented in the direction of the radially utmost indexable insert or at an angle differing by 45° from the latter, whereby bore holes can be cut whose diameter is only slightly larger than the drill diameter. This offers the advantage that the drilling tools can not jam in the bore hole and that no retraction scores occur when the drill shank is withdrawn. Thereby the inclination angle of at least the utmost indexable insert with respect to the longitudinal axis of the shank depends firstly on the apex angle, respectively apex angles formed by the effective cutting edge, respectively cutting edges of each indexable insert, further on the degree of overlapping of the working areas of the used indexable inserts as well as the drilling diameter, and finally also on the mutual relationship between the inclination angle of the bisectors of the used indexable inserts. Experience has proven that with the same apex angle of the used indexable inserts and with a fixed, preselected angle of inclination of the inner indexable insert, which can also be equal to zero, the inclination angle of the radially outer indexable insert has to be selected bigger when the drilling diameter decreases. The same applies also when indexable inserts with larger apex angles are selected. With the same apex angle and the same drilling diameter, the inclination angle of the inner indexable insert decreases when a larger inclination angle is selected for the radially outer indexable insert.

While according to the aforementioned first solution each time two geometrically similar indexable inserts each with two cutting edges of equal length have been used, whereby the respective two contiguous cutting edges form together an obtuse apex angle, according to a second embodiment, the use of at least one indexable insert with a trochoidal cutting edge is provided. For the inserting position of this trochoidal indexable insert the same applies with respect to the median axis of symmetry of this indexable insert as for the aforementioned bisector of the apex angle of an indexable insert with two equally long cutting edges.

The apex angles of the equally long cutting edges of the used indexable inserts should be selected between 115° and 160°, preferably at 160°, 156°, 145°, 125° or 115°. Depending on the apex angle, the inclination angles of the bisector with respect to the longitudinal shank axis are selected so that with an apex angle of 160° the inclination angle of the inner, respectively outer indexable insert will be of maximum 8°. With smaller apex angles, e.g. 115°, the inclination angle, respectively inclination angles can be selected up to a maximum of 25°.

According to a further embodiment of the invention, the bisector or the axis of symmetry of the cutting edge(s) of the inner indexable insert is inclined by a smaller angle with respect to the longitudinal shank axis than the respective angle of the outer indexable insert. Hereby with clearly overlapping areas of the indexable inserts the particular case is addressed when the inclination angle of the inner indexable insert equals zero, and the inclination angle of the outer indexable insert lies between 3° and 5°. When a total of two indexable inserts are arranged on the frontal end of the shank, it is further preferred that the inner indexable insert have two equally long cutting edges and the radially outer indexable insert use a trochoidal cutting edge. The inclination angle of the axis of symmetry of the trochoidal cutting edge can reach a maximum of 25°, and is preferably each time larger than the inclination angle of the bisector of the inner indexable insert.

Finally the drilling tool can be designed so that the indexable inserts have different sizes, respectively cutting edges of different length, seen from one indexable insert to the next indexable insert.

Preferably the length of the effective (engaged) cutting edge of the radial utmost indexable insert is by at a range of 8% to 15% longer than the length of the effective cutting edge of the radially innermost indexable insert. This is particularly the case where on one half of the drill more than one indexable insert is mounted and whereby the length of the effective cutting edge of the indexable inserts increases from innermost to the utmost indexable insert.

According to a further embodiment of the invention, the overlapping of the working areas of the cutting edges can be established also due to the fact that the radially inner indexable insert protrudes by a maximum of 0.15 mm with respect to the other indexable inserts. Thereby during the start of the drilling operation a good centering of the tool results.

BRIEF DESCRIPTION OF THE DRAWING

The above and other objects, features and advantages will become more readily apparent from the following description, references being made to the accompanying diagrammatical drawing, in which:

FIG. 1b is a frontal view of the drilling tool according to FIG. 1a;

FIGS. 3a–6a, are lateral views of the various embodiments of the drilling tool according to FIG. 1; and FIGS. 3b–6b are respective frontal views of the embodiments shown in FIGS. 3a–6a.

SPECIFIC DESCRIPTION

Figure 1A:
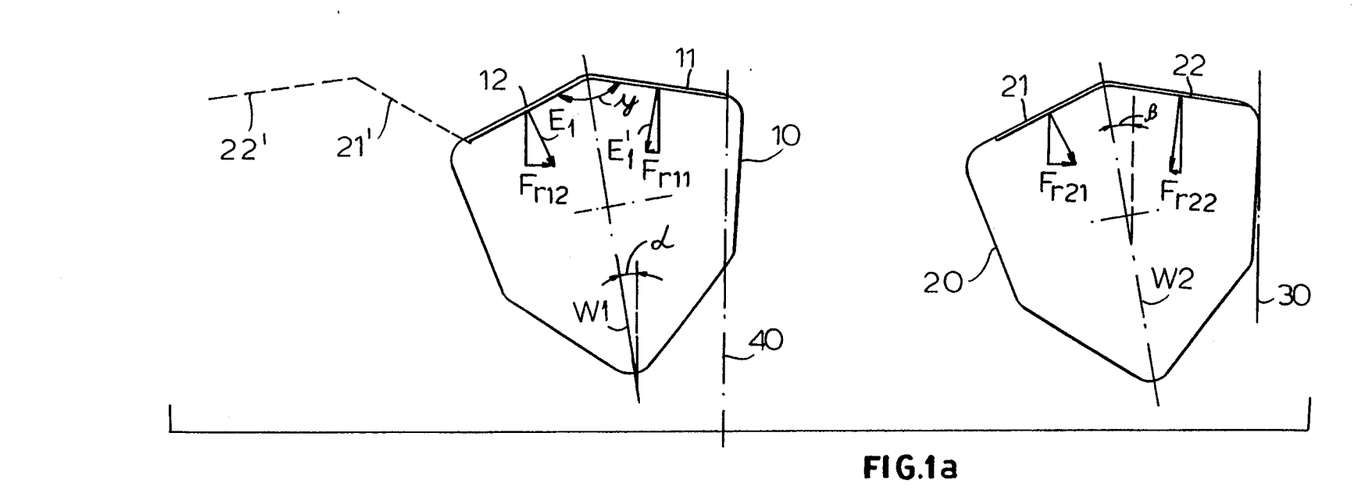
FIG. 1a is lateral view of the drilling tool according to the invention, respectively showing inner and outer inserts shown in solid lines.
Figure 1B:
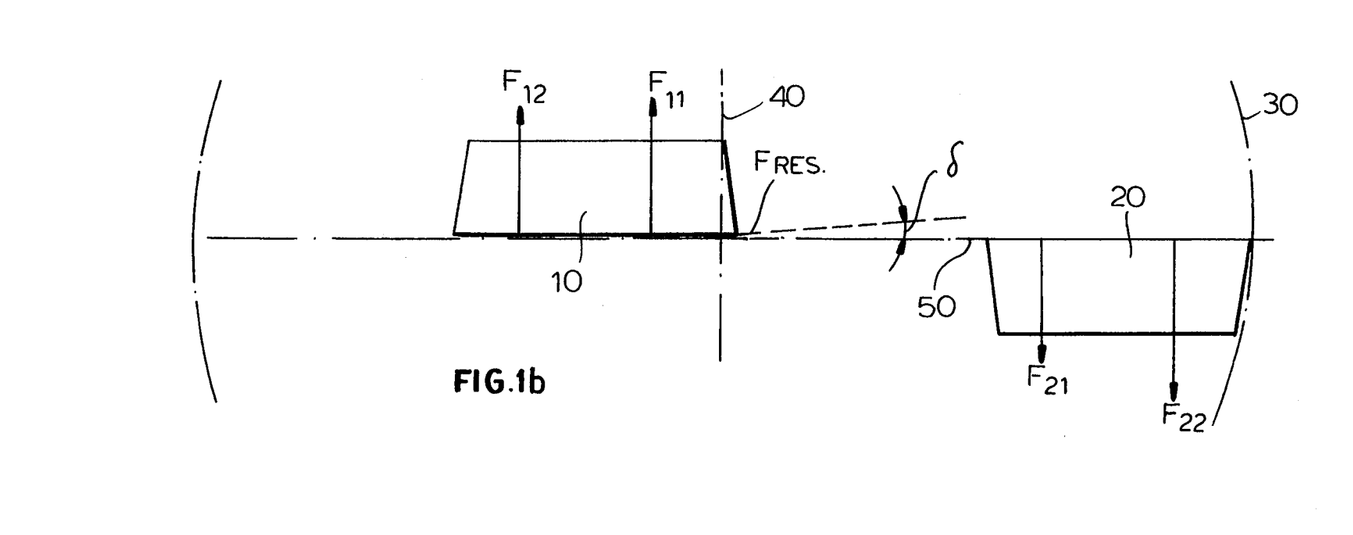

In FIGS. 1a to b a drilling tool according to the invention is shown to whose frontal shank side two indexable insert staggered by 180° are mounted. The hexagonal indexable inserts define together an apex angle $\gamma$ of 145°. Each of these indexable inserts has respectively cutting edges 11, 12 and 21, 22, whereby however the cutting paths of the radially outer cutting edge 12 and the one of the radially inner cutting edge 21 overlap. The radially outer indexable insert 20 determines the diameter of the bore, which is clearer defined by the bore wall 30. The radially inner indexable insert is arranged so that its radially inner cutting edge 11 extends slightly beyond the drill axis, respectively the longitudinal shank axis 40. In the embodiments of FIGS. 1a and 1b both indexable inserts with a respective apex angle $\gamma$ of 145° are inclined with respect to the longitudinal shank axis 40 by an angle $\alpha$, respectively $\beta$ of 20° respectively at 9°–10°. When the drilling tool is in use, at each cutting edge forces appear which can be taken up basically vertically to the cutting edges. In the example of the indexable insert 10 these cutting forces are taken up as $F_1$ and $F_2$ and can be decomposed into a vertical component parallel to the longitudinal shaft axis 40 and a radial component $F_{r12}$ and $F_{r11}$. A corresponding situation results from a consideration with reference thereto of the radially outer indexable insert 20. In addition to the forces acting vertically with respect to the cutting edges, also horizontal cutting forces occur, which can be seen in Fig. 1b marked with $F_{12}$, $F_{11}$, $F_{21}$ and $F_{22}$. While the horizontal cutting forces acting on the cutting edges 11 and 12 of the inner indexable insert are approximately equal (FIG. 1b) and correspond approximately to the horizontal cutting force $F_{22}$ acting on the cutting edge 22, the horizontal cutting force $F_{21}$ is slightly smaller because of the clearly shorter effective cutting edge 21. According to the concept of the invention, the inclinations of the bisectors W1 and W2 of the two indexable inserts 10 and 20 are selected so that the sum total of all radial forces $F_{r11}$, $F_{r12}$, $F_{r21}$ and $F_{r22}$ differs from zero. In this way, what remains with reference to all engaged cutting edges is a residual radial force component which together with all horizontal force components forms a resulting total residual force $F_{RES}$, which differs from zero and which pushes the drill radially in the direction 50 of the indexable insert 20 towards the outside, whereby a slightly larger drilling diameter than the one corresponding to the radial distance of the indexable insert 20 results. This insures that the drill can not jam during its advance and also does not cause scoring when withdrawn. The angle $\delta$ formed by the total residual force $F_{RES}$ with the straight line 50 equals a maximum of ±45°.

Figure 2A:
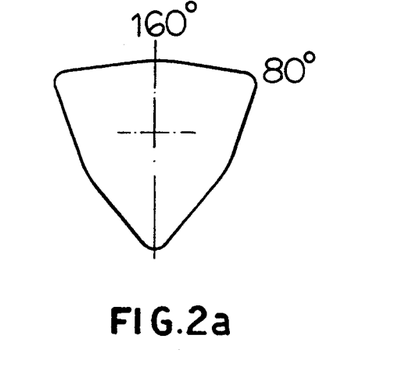
FIGS. 2a to 2e are respective lateral views of various indexable inserts, which can be inserted in the drilling tool.
Figure 2B:
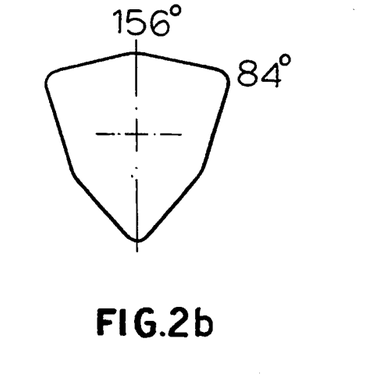
Figure 2C:
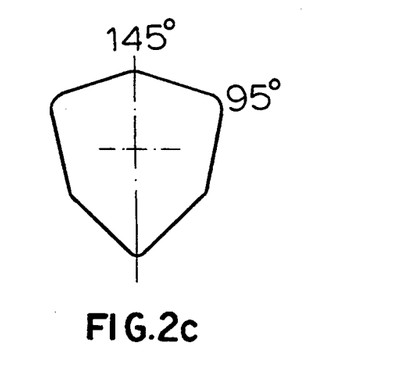
Figure 2D:
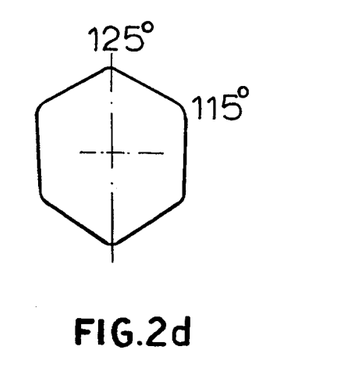
Figure 2E:
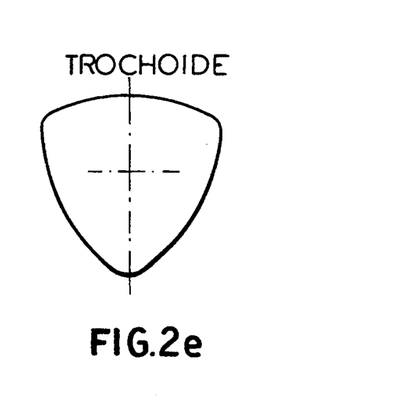

Instead of the indexable inserts 10 and 20 with an apex angle $\gamma$ of 145°, other indexable inserts can replace one or both indexable inserts according to FIG. 1. Such insertable indexable inserts are shown in FIGS. 2a to e with corresponding apex angles of 115°, 125°, 145°, 156° and 160° or a trochoidal cutting edge (FIG. 2e). The above listed apex angles correspond to a maximum bisector angle respectively equal to 8°, 12°, 15°, 20°, or 25°.

Figure 3A:
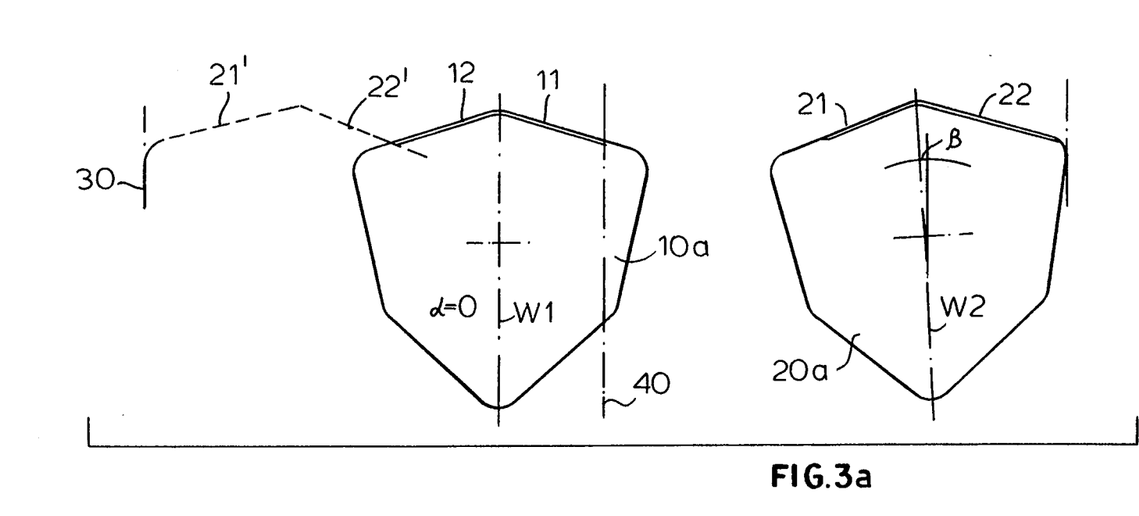

An embodiment variant of the arrangement in FIG. 1 is illustrated in FIGS. 3a and b. As opposed to FIG. 1, the radially inner indexable insert 10a is arranged so that their bisector W1 runs parallelly to the longitudinal shank axis 40. Besides, the cutting edge 11 extends beyond the drill middle by a far lager segment than the indexable insert 10 in FIG. 1a. The radially outer indexable insert, which has also an apex angle $\gamma = 145°$, is inclined by approximately 3° with respect to the longitudinal shank axis. The two cutting edges 21 of the radially outer indexable insert 20a as well as the outer cutting edge 12 of the radially inner indexable insert 10a overlap also clearly, so that in neither of the indexable inserts a radial balancing of the cutting forces takes place. Besides it results here too that the sum total of the radial cutting forces differs from zero. The occurring horizontal forces $F_{H1}$ and $F_{H2}$ are shown as hatched areas, whereby a resultant horizontal residual radial force component tending towards zero results, so that the residual radial force forms the total residual force FRES oriented in the direction of the indexable insert.

Figure 4A:
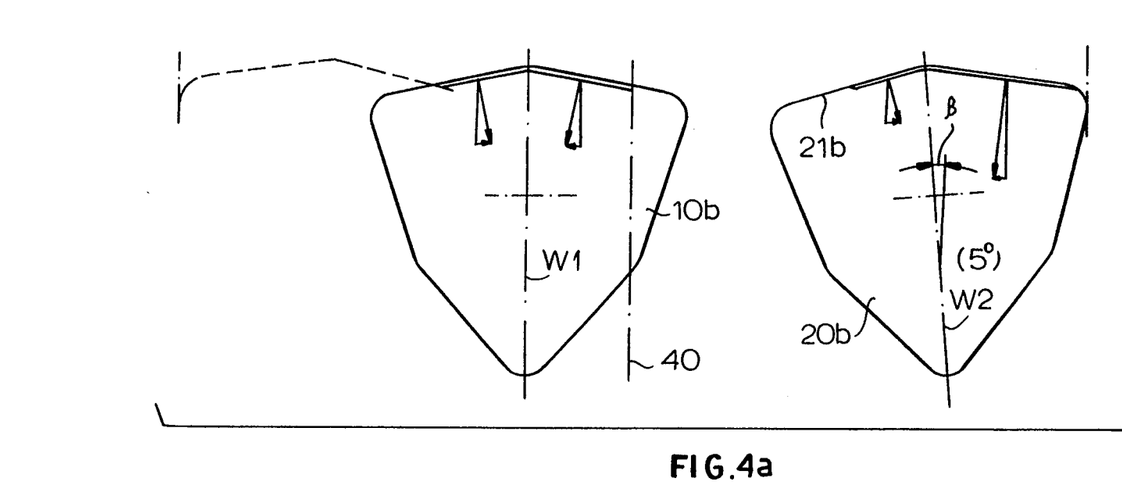
Figure 4B:
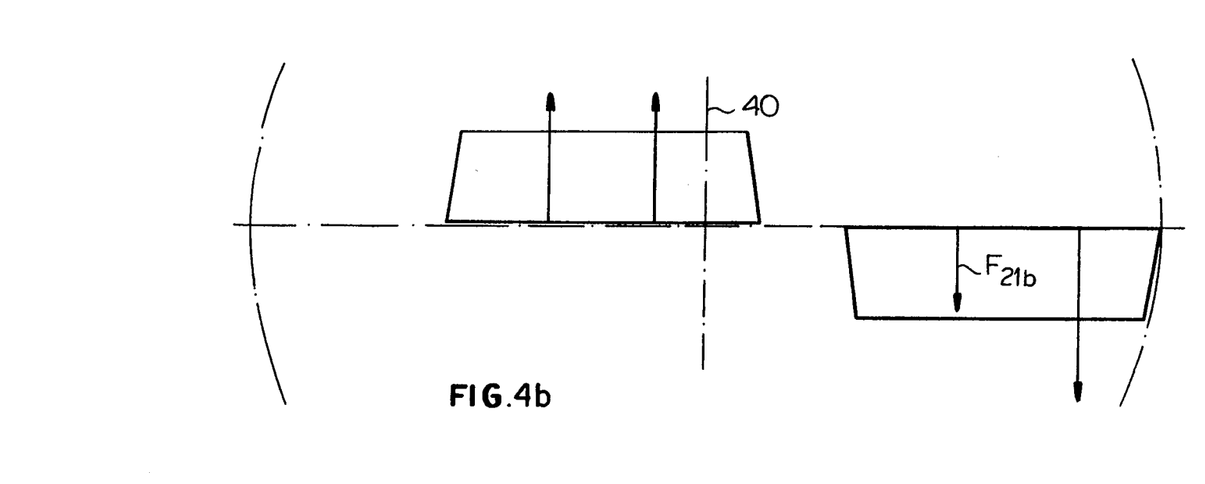
Figure 5A:
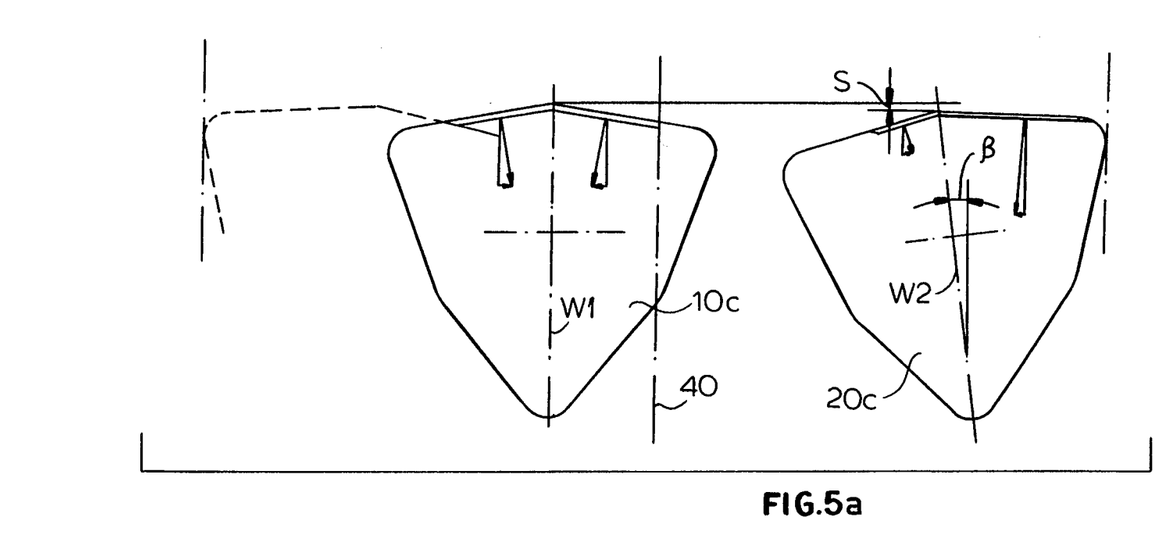
Figure 5B:
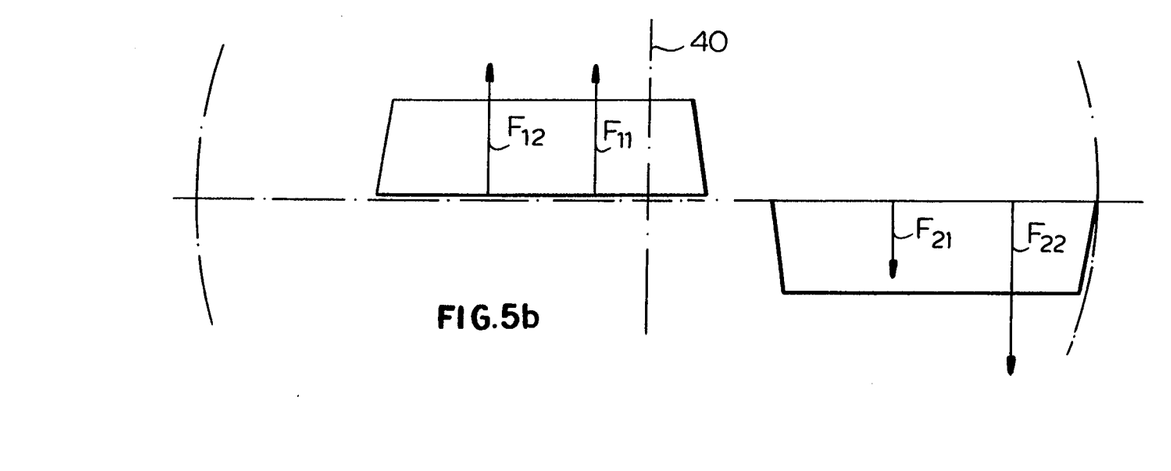

A corresponding force relationship is also achieved with the arrangement according to FIG. 4, wherein the radially inner indexable insert 10b is arranged so that its bisector W1 runs parallelly to the longitudinal shank axis 40. In opposition thereto, the radially outer indexable insert 20b is inclined by an angle $\beta$ of 5° with respect to the longitudinal shank axis. The cutting path of the radially outer cutting edge of the indexable insert 10b overlaps clearly with the cutting path followed radially by the inner cutting edge of the indexable insert 20b. Thereby the effective cutting edge 21b is almost reduced to half. Correspondingly lower is also the corresponding horizontal cutting force component $F_{21b}$. Thereby the horizontal components compensate each other. Thereby from the radial force components of the indexable insert 20b a common component is formed. An embodiment variant corresponding to FIG. 4 is shown in FIG. 5, whereby the apex angle of the used indexable inserts 10c and 20c each have 160°. The bisector W1 of the radially inner indexable insert 10c runs parallelly to the longitudinal shank axis 40, while the bisector W2 of the radially outer indexable insert is inclined by an angle of 9° with respect to the longitudinal shank axis.

Figure 3B:
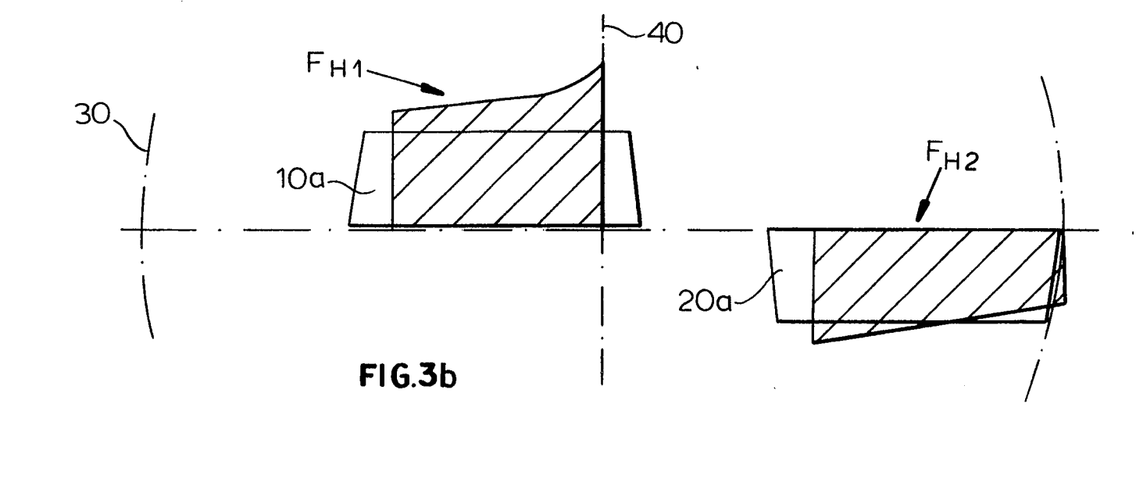

Generally it becomes clear from FIGS. 3, 4 and 5 that with an increasing apex angle of the indexable inserts and a constant angle $\alpha$, the inclination angle $\beta$ of the radially outer indexable insert has to increase.

Figure 6A:
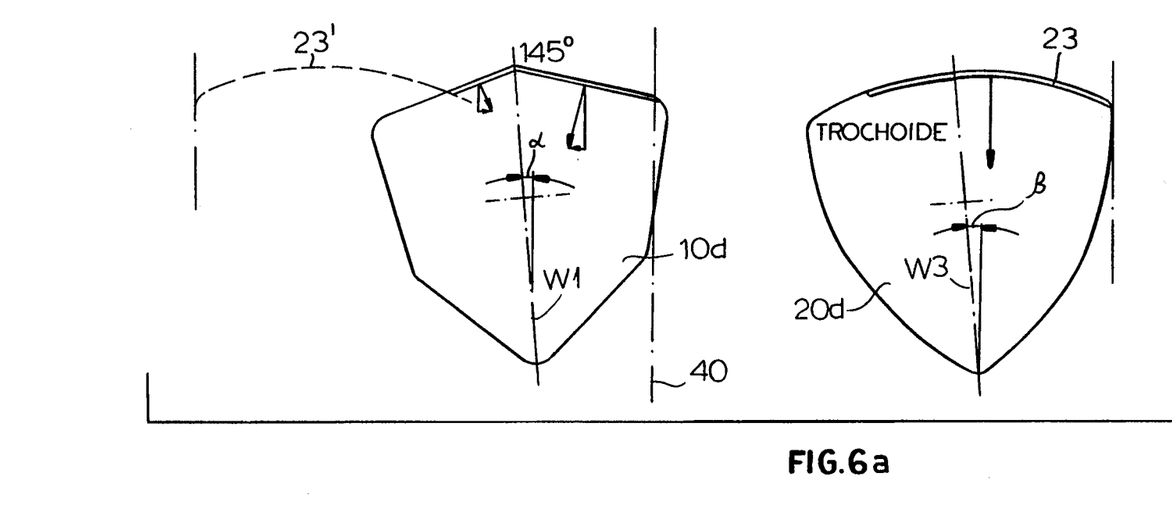
Figure 6B:
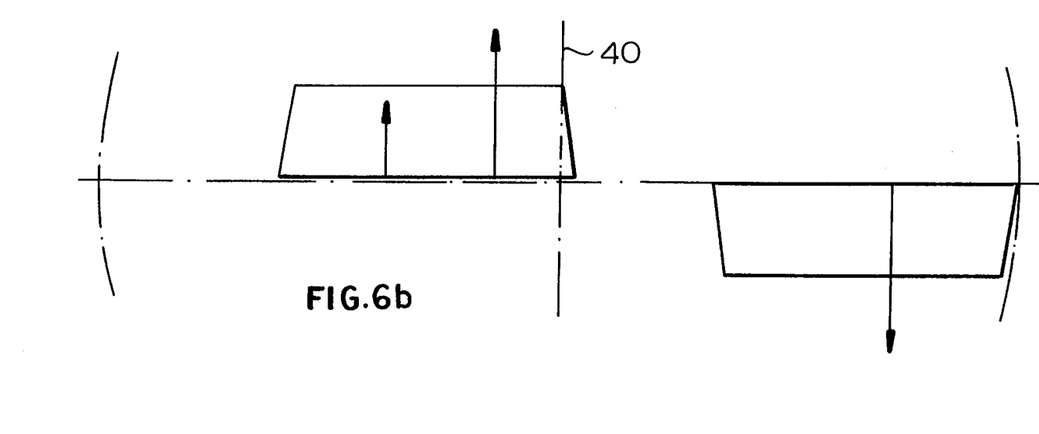

In all aforementioned embodiment examples the same indexable inserts (with identical apex angles) have been used. According to the embodiment shown in FIG. 6a, a corresponding effect can be achieved when as a radially outer indexable insert a trochoidal indexable insert 23 is used. The trochoidal indexable insert 23 is inclined so that its axis of symmetry W3 defines together with the longitudinal shank axis 40 an inclination angle $\beta$ of 5°. Approximately the same inclination angle $\alpha$ forms the bisector W1 of the radially inner indexable insert 10d, whereby the cutting path of the trochoidal cutting edge 23 (see broken line 23') clearly overlaps with the cutting path of the radially outer cutting edge of the indexable insert 10d. Here too a residual radial force component remains, which together with the horizontal residual force component forms a general force acting on the cutting edge in the direction of the radially outer indexable insert.

It is possible to use instead of indexable inserts of approximately the same size with approximately equally long cutting edges, also indexable inserts of different size, whereby the relative load on the cutting edges is lower, which has a wear-reducing effect on the cutting edges of the indexable inserts and also lowers the breaking risk of the indexable inserts. Here too the aim is to achieve an intended, strong overlapping of the cutting edge areas, which leads to the formation of residual radial force components, which according to the invention are equal but opposite to the horizontal residual radial cutting force components. As far as a remaining general resultant of radial forces and horizontal forces is accepted, this has in any case to be oriented in the direction of the radial line of an indexable insert.

As indicated in FIG. 5a, the radially inner indexable insert protrudes by a magnitude s, which does not surpass 0.15 mm.

What is claimed is:

1. A drilling tool for drilling a bore in a solid metal workpiece, said tool comprising:

a shank having a central axis of rotation and formed with a frontal end;

a plurality of geometrically similar indexable inserts mounted on said frontal end and staggered angularly equidistantly in a direction of a tool rotation from one another on said end, said inserts being spaced radially from said central axis at different radial distances, so that at least one of said plurality of inserts is an inner insert and another is an outer insert, each of said inner and outer inserts being formed with:

a respective pair of contiguous cutting edges of a uniform length engaging a workpiece, defining thereby a respective working area therein which overlaps another respective working areas defined by respective pairs of cutting edges of other inserts, the cutting edges of the respective pair extending toward one another at an obtuse angle having a respective axis of symmetry, a respective engaged cutting edge of said pair of the inner insert extending slightly beyond said central axis, at least one of the axes of symmetry of the respective pair of cutting edges of said inner and outer inserts being inclined at a respective bisector angle not greater than 25° with respect to said central axis and being inclined to the axis of symmetry of the other of said inner and outer inserts at a sector angle differing from 0°, all of the effectively engaged cutting edges of said inner and outer inserts generating a resulting horizontal force component which substantially equals zero upon rotation of the tool and a cumulative residual radial force component forming with said resulting horizontal force component a residual force resultant directed radially toward the outer insert at a force angle differing therefrom by a maximum of 45°.

2. The drilling tool defined in claim 1 wherein the obtuse angle is in the range of about 115° to 160°.

3. The drilling tool defined in claim 2 wherein said obtuse angle is 160°, 156°, 145°, 125° or 115° and corresponds to a maximum bisector angle respectively equal to 8°, 12°, 15°, 20°, or 25°.

4. The drilling tool defined in claim 1 wherein the bisector angle of the inner insert is smaller than the bisector angle of the outer insert.

5. The drilling tool defined in claim 1 wherein the bisector angle of the inner insert is zero.

6. The drilling tool defined in claim 1 wherein a total length of the cutting edges of the inner insert differs from a total length of the cutting edges of the outer insert.

7. The drilling tool defined in claim 1 wherein the an effective cutting edge length of the outer insert is larger by 8% to 15% than an effective cutting edge length of the inner insert.

8. The drilling tool defined in claim 1 wherein the inner insert extends axially frontwardly beyond the rest of the inserts by a maximum of 0.15 mm.

9. A drilling tool for drilling a bore in a solid metal workpiece, said tool comprising:
- a shank having a central axis of rotation and formed with a frontal end;
- a plurality of indexable inserts mounted on said frontal end and staggered angularly equidistantly in a direction of said rotation from one another on said end,
- said inserts being spaced radially from said central axis at different radial distances, at least one of said plurality of inserts being an inner insert formed with a respective pair of equally long contiguous cutting edges extending toward one another at an obtuse angle and extending slightly beyond said central axis with the respective engaged edge, so that the cutting edges of the inner insert define a respective working area in the workpiece upon engaging the workpiece, another of said plurality of inserts being an outer insert formed with a trochoidal cutting edge defining a respective working area overlapping the working area of the inner insert upon rotating the tool, said contiguous edges and said trochoidal edge having respective axes of symmetry, at least one of the axes of symmetry being inclined frontwardly toward said central axis at a bisector angle not exceeding 25° and toward the other axis of symmetry at an angle differing from zero, all of the effectively engaged cutting edges of said inserts generating a resulting horizontal force component which substantially equals zero upon rotation of the tool and a cumulative residual radial force component forming with said resulting horizontal force component a residual force directed radially toward the outer insert at a force angle differing therefrom by a maximum of 45°.

10. The drilling tool defined in claim 9 wherein the obtuse angle of the inner insert is in the range of about 115°–160°.

11. The drilling tool defined in claim 9 wherein the bisector angle of the outer trochoidal insert is maximum 20°.

12. The drilling tool defined in claim 9 wherein the bisector angle of the inner insert being smaller than the one of the trochoidal outer insert.

13. The drilling tool defined in claim 9 wherein the bisector angle of the inner insert is zero.

14. The drilling tool defined in claim 9 wherein the cutting edges of the inner insert has a total effective cutting length differing from an effective cutting length of the trochoidal edge of the outer insert.

15. The drilling tool defined in claim 14 wherein the effective cutting edge length of the outer insert is larger by 8% to 15% than the effective cutting edge length of the inner insert.

16. The drilling tool defined in claim 9 wherein the inner insert extends axially frontwardly beyond the rest of the inserts by maximum 0.15 mm.

* * * * *